United States Patent [19]

Nagato et al.

[11] Patent Number: 4,514,738

[45] Date of Patent: Apr. 30, 1985

[54] THERMAL RECORDING SYSTEM

[75] Inventors: Hitoshi Nagato; Koji Izawa; Shuzo Hirahara, all of Yokohama, Japan

[73] Assignee: Tokyo Shibaura Denki Kabushiki Kaisha, Kawasaki, Japan

[21] Appl. No.: 554,300

[22] Filed: Nov. 22, 1983

[30] Foreign Application Priority Data

Nov. 22, 1982 [JP] Japan ............................... 57-207710

[51] Int. Cl.[3] .............................................. G01D 15/10

[52] U.S. Cl. ................................ 346/76 PH; 346/1.1

[58] Field of Search ........................... 346/76 PH, 1.1; 400/120

[56] References Cited

U.S. PATENT DOCUMENTS 4,347,518 8/1982 Williams .................... 346/76 PH X 4,399,749 8/1983 Arai ........................... 346/76 PH X 4,415,907 11/1983 Suemori ......................... 346/76 PH 4,475,114 10/1984 Koyama ......................... 346/76 PH

*Primary Examiner*—Joseph W. Hartary

*Attorney, Agent, or Firm*—Oblon, Fisher, Spivak, McClelland & Maier

[57] ABSTRACT

A recording system has a thermal head having a plurality of thermal heating resistive elements aligned in line and a drive circuit for selectively energizing the thermal heating resistive elements to record image data for one line. The recording system also has a calculator for calculating supply energy data supplied to each resistive element for recording one-line image data in accordance with the one-line image data and the storage energy stored in each of the resistive elements after the immediately preceding line is recorded. A control circuit controls the supply energy supplied to each resistive element through drive circuits in response to the supply energy data.

12 Claims, 10 Drawing Figures

| i-2 | i-1 | i | i+1 | i+2 |
|---|---|---|---|---|
| Qi-2 | Qi-1 | Qi | Qi+1 | Qi+2 |
| Di-2 | Di-1 | Di | Di+1 | Di+2 |

THERMAL RECORDING SYSTEM

BACKGROUND OF THE INVENTION

The present invention relates to a thermal recording system.

Along with the development and popularity of data processing apparatus such as personal computers and word processors, recording apparatus have increased in importance as output terminal devices. Various types of recording or printing apparatus such as wire-dot, ink-jet and thermosensitive recording apparatus have been developed. Among these, a thermal recording apparatus is receiving most attention these days. The thermal recording apparatus has advantages in that a normal paper sheet can be used for recording, a noise level at the time of recording is low, a recording mechanism is simple, easy maintenance can be performed, and alteration of recorded data is impossible. Furthermore, along with the development of color output terminal devices such as a color CRT display, there arises a demand for a color recording apparatus. A color thermal recording apparatus can be easily arranged to perform good color reproduction. The color thermal recording apparatus is the most promising apparatus among various types of color recording apparatus.

In the conventional thermal recording apparatus, a number of thermal heating resistive elements are aligned in line, and the thermal heating resistive elements are selectively supplied with current in accordance with a recording signal. This energizing cycle is then repeated to heat the resistive elements, so that an ink carried on an ink ribbon is melted by the heated resistive element. The ink is then transferred to the paper sheet so as to record an image on the sheet. Although the thermal recording apparatus has the above advantages, it has a drawback in that the recorded image becomes poor due to a heat retention or storage effect of the resistive elements as the recording speed increases. In order to increase the recording speed, an interval between energizing cycles is shortened. When a resistive element which was energized in the immediately preceding energizing cycle is reenergized after a short time interval, heat cannot be sufficiently lost. Therefore, when the same resistive element is successively energized at a short interval after the immediately preceding energizing cycle, the temperature of this resistive element continues to increase. In this manner, when the energizing cycles are repeated at short intervals, the present temperatures of the individual resistive elements differ due to their thermal history. When resistive elements having different temperatures are simultaneously energized, areas at which inks are melted differ, thereby resulting in an image having a nonuniform density. In particular, when characters are recorded, the ink is often transferred to a narrow space which does not correspond to the image data, thus degrading legibility.

In order to solve the above problem, a system is proposed in Japanese Patent Publication No. 55-48631, wherein an energizing time of each thermal heating resistive element when mark data as recording data are continuously supplied is set to be shorter than that when the mark data follows space data. The energizing time of the subsequent energizing cycle of a given thermal heating resistive element is switched in a two-step manner in accordance with whether or not the given resistive element was energized in the immediately preceding energizing cycle. According to this system, the above drawback can be eliminated to some extent. However, in fact, this system cannot eliminate the nonuniform density of the recorded image since the thermal histories of the resistive elements still differ from each other, especially in high speed recording, due to insufficient controllability.

SUMMARY OF THE INVENTION

It is an object of the present invention to provide a thermal recording system capable of recording an image at a stable recording density.

It is another object of the present invention to provide a thermal recording system arranged to control supply energy to be supplied to thermal heating resistive elements for recording image data at the present time in consideration of a previous thermal history thereof.

A thermal recording system according to the present invention comprises a thermal head having a number of thermal heating resistive elements aligned in line, and drive circuit means for selectively energizing the thermal heating resistive elements, by current supply, in accordance with image data to print the image data on a line. The thermal recording apparatus has a calculation circuit means for calculating, from storage energy which would be stored in each thermal heating resistive element after image data of one line has been recorded and image data of the next line, supply energy to be supplied to each resistive element to record the image data of the next line and storage energy stored in each resistive element after the image data of the next line has been recorded. A control circuit means causes the drive circuit means of the thermal head to control energy supplied to each thermal heating resistive element in response to the supply energy data from the calculation circuit means. The storage energy data is stored in a memory and is used for calculating the next supply and storage energy.

DETAILED DESCRIPTION OF THE PREFERRED EMBODIMENT

Figures 1, 2:
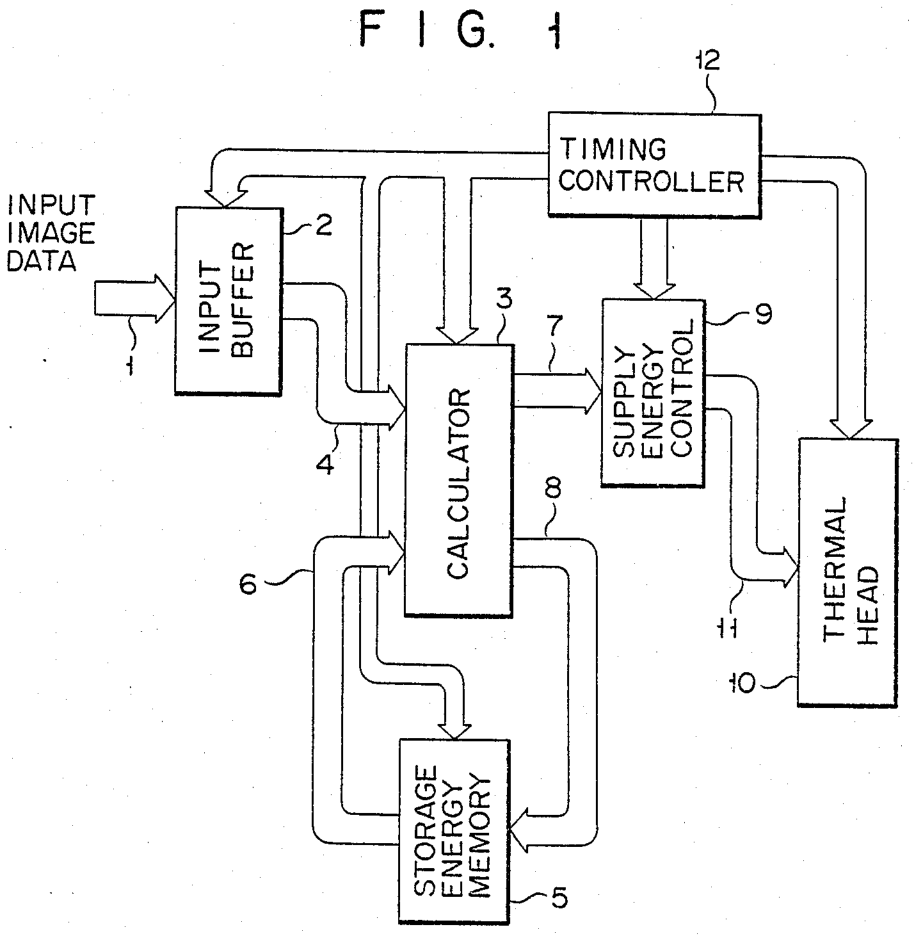
FIG. 1 is a block diagram of a thermal recording system embodying the present invention.
FIG. 2 is a data format used for calculating the storage energy of the ith thermal heating resistive element of the thermal head.

FIG. 1 shows the schematic configuration of a thermal recording or printing system embodying the present invention. Input image data or recording data 1 is supplied to an input buffer 2 and is properly processed therein. An output signal of the input buffer becomes an input signal 4 of a calculator 3 for calculating supply energy and storage energy of each thermal heat resistive element. The calculator 3 calculates the supply enregy to each thermal heating resistive element and storage energy which would be stored therein after energization, in accordance with output data 4 of the input buffer 2 and output data 6 of a storage energy memory 5, and outputs calculated supply energy data 7 and storage energy data 8 to a supply energy control 9 and the storage energy memory 5, respectively. The storage energy memory 5 stores storage energy data of each resistive element calculated from the beginning of printing up to the present moment. Storage energy data 6 read out from the storage energy memory 5 is supplied as the input signal 6 to the calculator 3. The storage energy data stored in the storage energy memory 5 are sequentially updated in units of thermal heating resistive elements every time new storage energy data are calculated by the calculator 3, so that the memory 5 holds the present storage energy data of the resistive elements. The supply energy control 9 temporarily stores supply energy data 7. The supply energy data 7 is read out in response to a readout signal and is supplied as input data 11 to a thermal head 10. The circuits of the thermal recording apparatus are controlled by a timing controller 12. The above description illustrates the overall configuration of the thermal recording apparatus of the present invention. The functions of the individual parts will be described in detail below.

In this embodiment, the supply energy to be supplied to each resistive element and the storage energy stored in each resistive element after energization are calculated in accordance with the input image data and the storage energy data stored in the memory 5. The relationship between the input image data and the storage energy data is shown in FIG. 2.

Assume that supply energy data and corresponding storage energy data are calculated for the ith thermal heating resistive element of the thermal head, that the thermal heating resistive elements aligned to the right of the ith element are the (i−1)th, (i−2)th, . . . , elements, and that the thermal heating resistive elements aligned to the left of the ith element are the (i+1)th, (i+2)th, . . . , elements. In this embodiment, the thermal head has an A4width and comprises a line head of 12 dots/mm. Therefore, $1 \leqq i \leqq 2592$. The supply energy to be supplied to the ith resistive element is calculated from the input image data $D_i$, $D_{i\pm1}$, and $D_{i\pm2}$ respectively to the ith, (i±1)th and (i±2)th resistive elements, and storage energy data $Q_i$, $Q_{i\pm1}$ and $Q_{i\pm2}$ thereof. Similarly, the storage energy of the ith resistive element after energization is calculated from the input image data $D_i$, $D_{i\pm1}$, and $D_{i\pm2}$ respectively supplied to the ith, (i±1)th and (i±2)th resistive elements, and storage energy data $Q_i$, $Q_{i\pm1}$ and $Q_{i\pm2}$ thereof. The energy data for each resistive element is represented by 4-bit data.

Figure 3:
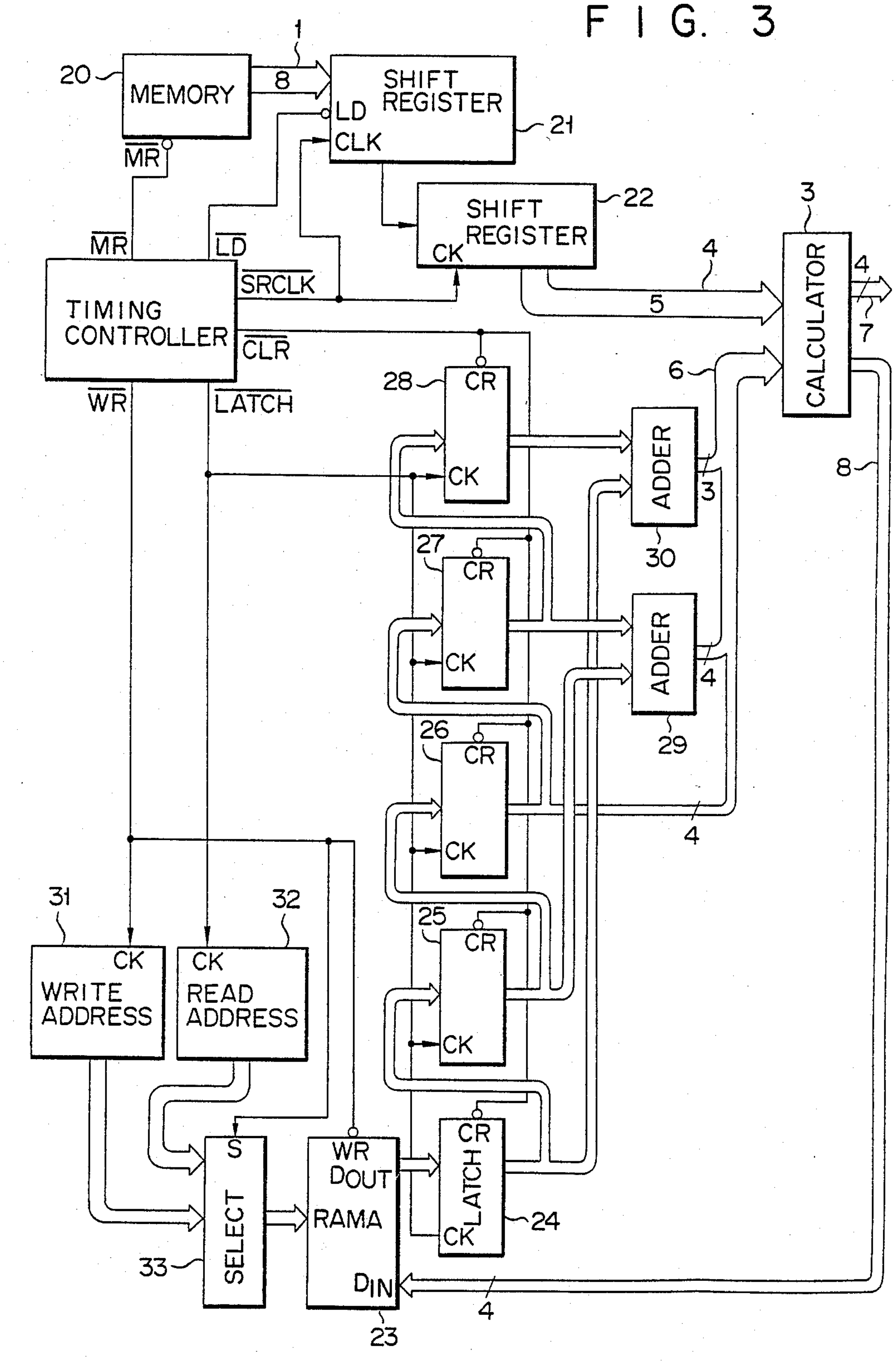
FIG. 3 is a block diagram of a storage energy memory shown in FIG. 1.

FIG. 3 shows the configuration of the input buffer 2 and the storage energy memory 5. In this embodiment, the image data are stored in an image memory 20. The image data is read out as the 8-bit parallel input image signal 1 from an image memory 20 in response to a signal $\overline{MR}$ generated from the timing controller 12, and is loaded into a shift register 21 in response to a signal $\overline{LD}$. The shift register 21 performs parallel-to-serial conversion. The image data 1 is loaded into the next shift register 22 in a serial manner in response to a signal $\overline{SRCLK}$ generated after loading of image data into the shift register 21. When the 8-bit data is read out from the shift register 21 in response to the signal $\overline{SRCLK}$, the timing controller 12 stops generating the signal $\overline{SRCLK}$ and starts generating the signal $\overline{MR}$ so that the next image data is read out from the image memory 20. The above operation is repeated until the image data corresponding to one line are read out from the image memory 20. Each bit of the image signal corresponds to a resistive element for one-dot display.

The parallel-to-serial conversion is performed by the shift register 21 to calculate the supply energy and the storage energy in units of resistive elements. However, where the image data is serially received, it may be directly loaded into the shift register 22. The shift register 22 serves to extract the image data $D_i$, $D_{i\pm1}$ and $D_{i\pm2}$ (to be supplied to the calculator 3) from the serial image data taken from the shift register 21.

In this embodiment, as shown in FIG. 2, the data 4 supplied to the calculator 3 comprise input image data to the ith, (i±1)th and (i±2)th resistive elements. Therefore, among the outputs of the shift register 22, the 5-bit image data corresponding to the ith, (i±1)th and (i±2)th resistive elements is supplied to the calculator 3.

A random access memory (RAMA) 23, latches 24, 25, 26, 27 and 28, adders 29 and 30, a write address counter 31, a read address counter 32 and a selector 33 constitute the storage energy memory 5 shown in FIG. 1. The RAMA 23 stores storage energy data of the resistive elements. Addresses of the RAMA 23 correspond to the respective resistive elements of the thermal head. In this embodiment, the address counters 31 and 32 designate 2592 addresses. The storage energy data 8 calculated by the calculator 3 has four bits. The 4-bit storage energy data 8 is supplied to a terminal $D_{IN}$ of the RAMA 23 and is written at an address specified by the write address counter 31 in response to a signal $\overline{WR}$ generated from the timing controller 12. When the signal $\overline{WR}$ is not supplied to a terminal $\overline{WR}$ of the RAMA 23, the 4-bit storage energy data stored at the address designated by the read address counter 32 is read out to a terminal $D_{OUT}$ of the RAMA 23. Each of the latches 24 to 28 comprises a 4-bit latch which latches a 4-bit input signal in response to a signal $\overline{LATCH}$ generated by the timing controller 12, and holds the latched data until the next signal $\overline{LATCH}$ is supplied thereto. The latches 24 to 28 are connected in cascade to constitute a shift register so that 4-bit data is sequentially shifted toward the output stage every time the signal $\overline{LATCH}$ is supplied thereto.

The storage energy data of a first resistive element which is specified by the read address counter 32 is read out from the terminal $D_{OUT}$ of the RAMA 23 and is latched by the latch 24 in response to a first $\overline{LATCH}$ signal. The count of the read address counter 32 is incremented by one in response to the first $\overline{LATCH}$ signal, so that the storage energy data of a second resistive element is read out from the terminal $D_{OUT}$. In response to the next $\overline{LATCH}$ signal, the storage energy data of the second resistive element is latched by the latch 24. At the same time, the storage energy data of the first resistive element is latched by the latch 25.

In this manner, each time the $\overline{LATCH}$ signal is issued, the storage energy data from the RAMA are sequentially shifted. When the storage energy data $Q_i$ of the ith resistive element is latched by the latch 26, storage energy data of the (i+1)th, (i+2)th, (i−1)th and (i−2)th resistive elements are latched by the latches 25, 24, 27 and 28, respectively.

As previously described, the supply energy data of the ith resistive element and the storage energy data after energization thereof are calculated in accordance with the input image data to the ith, (i±1)th and (i±2)th resistive elements, and with storage energy data thereof obtained to date. In other words, the supply energy data and the storage energy data can be calculated in accordance with data having a total of 25 bits (i.e., 5-bit data from the shift register 22 and the 20-bit (4 bits×5) storage energy data from the latches 24 to 28).

However, a calculation with 25 bits becomes complicated, so that the following simple operation is performed in practice.

The calculation process is based on a well-known equation of heat conduction as follows:

$$\partial T/\partial t=a(\partial^2T/\partial x^2+\partial^2T/\partial y^2+\partial^2T/\partial z^2)+q/\rho C \tag{1}$$

where

T: temperature a: heat diffusion ratio q: heat energy per unit volume and unit time ρ: density C: specific heat In order to control the supply energy for the thermal head in accordance with a digital calculation, a solution to equation (1) must have a format which is readily applicable to calculation by a digital circuit.

Assume that the printing period is defined as a time increment $\Delta\tau$, and that the pitch of the array of thermal heating resistive elements, the width of the resistive element along the direction perpendicular to the array, and the thickness of a glass layer immediately under the resistive element are defined as spatial increments Δx, Δy and Δz. Also assume that the temperature in the vicinity of the ith resistive element in a given printing period n is defined as $T_{in}$. The energy balance at the point i is given by the following general equation in the form of a forward difference equation:

$$\sum_{j=1}^{5}(T_{jn}-T_{in})/R_j+q_{in}-q_0=C_t(T_{in+1}-T_{in})/\Delta\tau \tag{2}$$

where

| | |
|---|---|
| $T_{1n}=T_{i-1n}$, | $R_1=(\Delta x/\Delta y\Delta z)\cdot(1/k)$ |
| $T_{2n}=T_{i+1n}$, | $R_2=R_1$ |
| $T_{3n}=T_{Uin}$, | $R_3=(\Delta y/\Delta z\Delta x)\cdot(1/k)$ |
| $T_{4n}=T_{Din}$, | $R_4=R_3$ |
| $T_{5n}=T_0$, | $R_5=(\Delta z/\Delta x\Delta y)\cdot(1/k)$ |

$T_0$ is the room temperature, k is the heat conductivity, $q_0$ is the energy used for activating a coloring agent, and $q_i^n$ is the energy supplied from a resistive element.

The energy $q_0$ must be kept constant to obtain the optimum printing quality by means of the thermal head. The energy $q_0$ is determined by a time integral of the temperature gradient in the direction toward the coloring agent. If a pulse width $T_{in}$ of a pulse applied to a thermal heating resistive element to determine the energizing time is a controllable factor, the energy $q_0$ depends on $T_{in}$ indicating the storage state and the energy $q_{in}((V^2/R)\cdot t_{in})$ which is a function of $T_{in}$.

In order to keep the energy $q_0$ constant, such $t_{in}$, a function of $T_{in}$, as to keep $q_0$ constant must be obtained. A distance between the thermal heating resistive element and the coloring agent is shorter than the dimensions of the resistive element, so that the equation can be dealt with as a matter of onedimensional nonsteady heat conduction. The present inventors obtained the following solution:

$$t_{in}=K_{E1}\cdot D_{in}[\{1+K_{E2}(1-Q_{in})\}/\{1-K_{E3}(1-Q_{in})\}]^2 \tag{3}$$

where $K_{E1}$, $K_{E2}$ and $K_{E3}$ are constants, respectively, $D_{in}$ is printing data which indicates "1" (mark) or "0" (blank) and $Q_{in}T_{in}/(T_c-T_0)$ ($T_{in}\leqq T_c$=a constant normalized temperature). The supply energy $q_{in}$ is determined by equation (3). As a result, $T_{in+1}$, that is, the temperature during the next printing period can be predicted from equation (2).

$T_{in+1}$ is in practice a function of not only $T_{in}$ and $T_{i+1n}$ but also $T_{Uin}$ and $T_{Din}$. However, the following equation can be obtained in consideration of the heat conduction and the recording or printing speed:

$$Q_{in+1}=K_{Q1}\{Q_{in}+K_{Q2}(1-Q_{in})\sqrt{t_{in}}\}+K_{Q3}\{(Q_{i-1n}+Q_{i+1n})/2\}+K_{Q2}(\sqrt{t_{i-1n}}+\sqrt{t_{i+1n}})\{1-(Q_{i-1n}+Q_{i+1n})/2\} \tag{4}$$

where $K_{Q1}$, $K_{Q2}$ and $K_{Q3}$ are constants.

Equations (3) and (4) may be rewritten as follows:

$$t_{in}=f(Q_{in},D_{in}) \tag{5}$$

$$Q_{in+1}=g(Q_{in},Q_{i\pm1n},D_{in},D_{i\pm1n}) \tag{6}$$

The width $t_i^n$ of the pulse applied to the resistive element can be understood to be calculated from the storage energy $Q_i^n$ and the input image data $D_{in}$. Similarly, the storage energy data $Q_{in+1}$ during the next printing period can be derived from the present storage energy distribution $Q_{i+mn}$ and the data stream $D_{i+mn}$ (where m=−1, 0, +1) in accordance with equation (6).

The storage energies of the (i±1)th resistive elements (($R_{i\pm1}$)) which influence the ith resistive element ($R_i$) are assumed to be substantially identical to each other. Therefore, the arithmetic mean of the storage energy of the (i−1)th and (i+1)th resistive elements is used in equation (4).

In order that the solution of the difference equation (2) converges, the printing period must be shorter than about 3.8 msec when the resolution of the thermal head is 12 dots/mm; and the printing period must be shorter than about 2.1 msec when the resolution is 16 dots/mm. As the resolution is increased, heat tends to be conducted further than the adjacent volume unit consisting of one resistive element and glass layer immediately thereunder within a printing period. In view of such a phenomenon, the heat conduction from the volume units associated with the two adjacent resistive elements ($R_{i\pm1}$, $R_{i\pm2}$) on the right and left sides of the volume unit associated with the ith resistive element ($R_i$) is considered.

Equation (3) is of a form which can be easily handled in this embodiment. Various types of equations can be derived in accordance with: physical conditions such as the printing period, the head resolution, the head construction and the head material; the properties of the material; and an approximation method to obtain a solution.

The adders 29 and 30 are provided in FIG. 3 in consideration of thermal conduction from the adjacent volume units.

The adder 29 serves to calculate an average of 4-bit storage energy data of the (i+1)th and (i−1)th resistive elements obtained from the latches 25 and 27. Namely, the four more significant bits of the adder 29 are used as the storage energy data to be supplied to the calculator 3. Similarly, the adder 30 calculates the average value of the 4-bit storage energy data of the (i+2)th and (i−2)th resistive elements which are respectively obtained from the latches 24 and 28. The three more significant bits of the adder 30 are used as the storage energy data of the (i±2)th resistive elements to be supplied to the calculator 3.

The 5-bit image data from the shift register 22, the 4-bit data of the ith resistive element from the latch 26, the 4-bit storage data of the (i±1)th resistive elements from the adder 29, and the 3-bit storage energy data of the (i±2)th resistive elements from the adder 30 are applied to the calculator 3. In other words, 16 bits in total are used.

The calculator 3 calculates the supply energy $E_{in}$ to be injected to the ith resistive element, and the storage energy $Q_{i(n+1)}$ which will be stored in the ith resistive element until the ith element is again energized after the supply energy $E_{in}$ has been injected in the ith element, in accordance with the input image data $D_{i-2}$, $D_{i-1}$, $D_i$, $D_{i+1}$ and $D_{i+2}$ and the storage energy data $Q_{i\pm 2n}$, $Q_{i\pm 1n}$ and $Q_{in}$ obtained to date.

The calculator 3 simulates the equation of heat conduction in accordance with equations (3) and (4) to provide prediction values of the proper supply energy, and storage energy in the next printing period. The supply energy data is applied to the thermal head 10 through the supply energy control 9. The storage energy prediction data is stored in the storage energy memory 5 and is used as input data to the calculator 3 in the next printing period. The contents of the storage energy memory 5 are updated every printing period.

In this embodiment, the calculator comprises a ROM. The supply energy data and the storage energy data which have been calculated by a computer in advance are stored in the ROM. The 5-bit image data and the 11-bit storage energy data are used as 16-bit address data of the ROM. The 4-bit supply energy data 7 and the 4-bit storage energy data 8 are read out from the ROM. The upper four bits of one-byte output of the ROM are assigned to the supply energy data, and the lower four bits thereof to the storage energy data. Therefore, the capacity of the ROM of the calculator 3 is 64K bytes.

The operation of the circuit shown in FIG. 3 will be described with reference to the timing charts in FIGS. 4A and 4B. The 8-bit image data is read out from the image memory 20 in response to the signal $\overline{MR}$ and is loaded in the shift register 21 in response to the falling edge of the signal $\overline{LD}$. The 8-bit data loaded in the shift register 21 are serially loaded into the shift register 22 in response to the rising edges of the signal $\overline{SRCLK}$. When the 8-bit data shift is completed, the signal $\overline{MR}$ is issued again from the timing controller 12 to load the next 8-bit data into the shift register 21. Thereafter, the above operation is repeated until data (324 bytes) on one line are shifted.

The timing controller 12 generates the signal $\overline{LATCH}$ together with the signal $\overline{SRCLK}$ so as to shift the storage energy data from the RAMA 23 from the lower latches to the upper latches. The count of the read address counter 32 is incremented by one every time the signal $\overline{LATCH}$ is applied to the latches, so that the storage energy data are sequentially read out from the terminal $D_{OUT}$ of the RAMA 23. The storage energy data calculated by the calculator 12 are sequentially stored in the RAMA 23 in response to the signal $\overline{WR}$. The count of the write address counter 31 is incremented every time the data is stored in the RAMA 23.

Figure 4A:
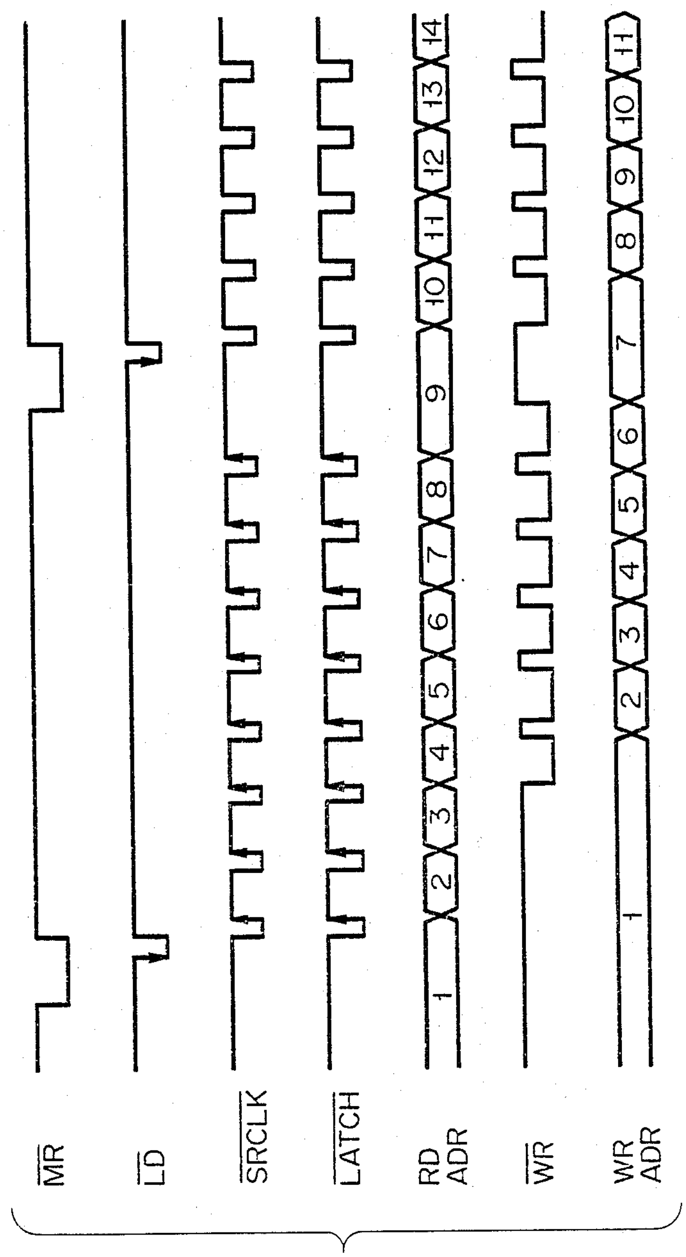
FIGS. 4A and 4B are respectively timing charts for explaining the operation of the storage energy memory shown in FIG. 3.
Figure 4B:
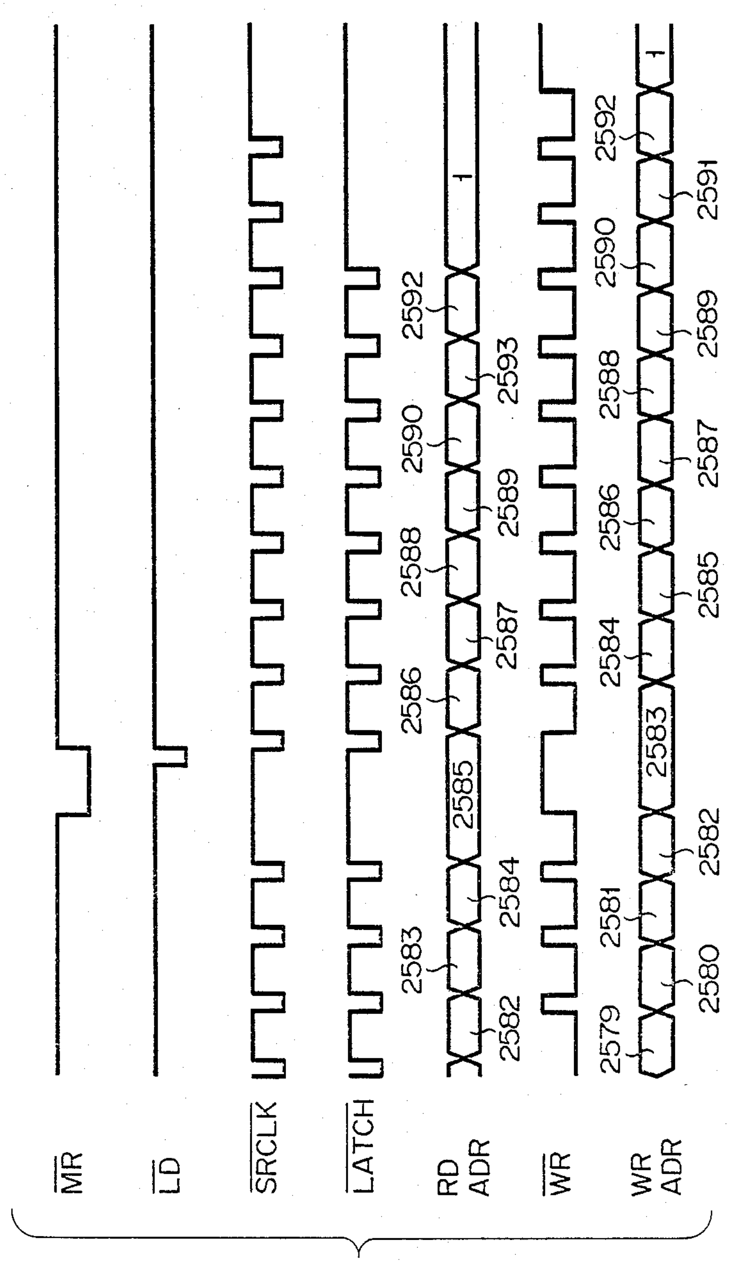

The read address differs from the write address in FIG. 4A or 4B, since the image data of the first resistive element must be shifted to the 3rd bit from the LSB of the shift register 22 and the storage energy data of the first resistive element must be shifted to the latch 26 in order to calculate the supply energy and the storage energy of the first resistive element. The selector 33 is used to switch between the read address signal and the write address signal. When data calculation for one line is completed, all the signals are made off until a read synchronizing signal for the next line is issued. When the synchronizing signal is issued, data readout is performed for the next line. The above operations are repeated until the data processing of all lines is completed.

Figure 5:
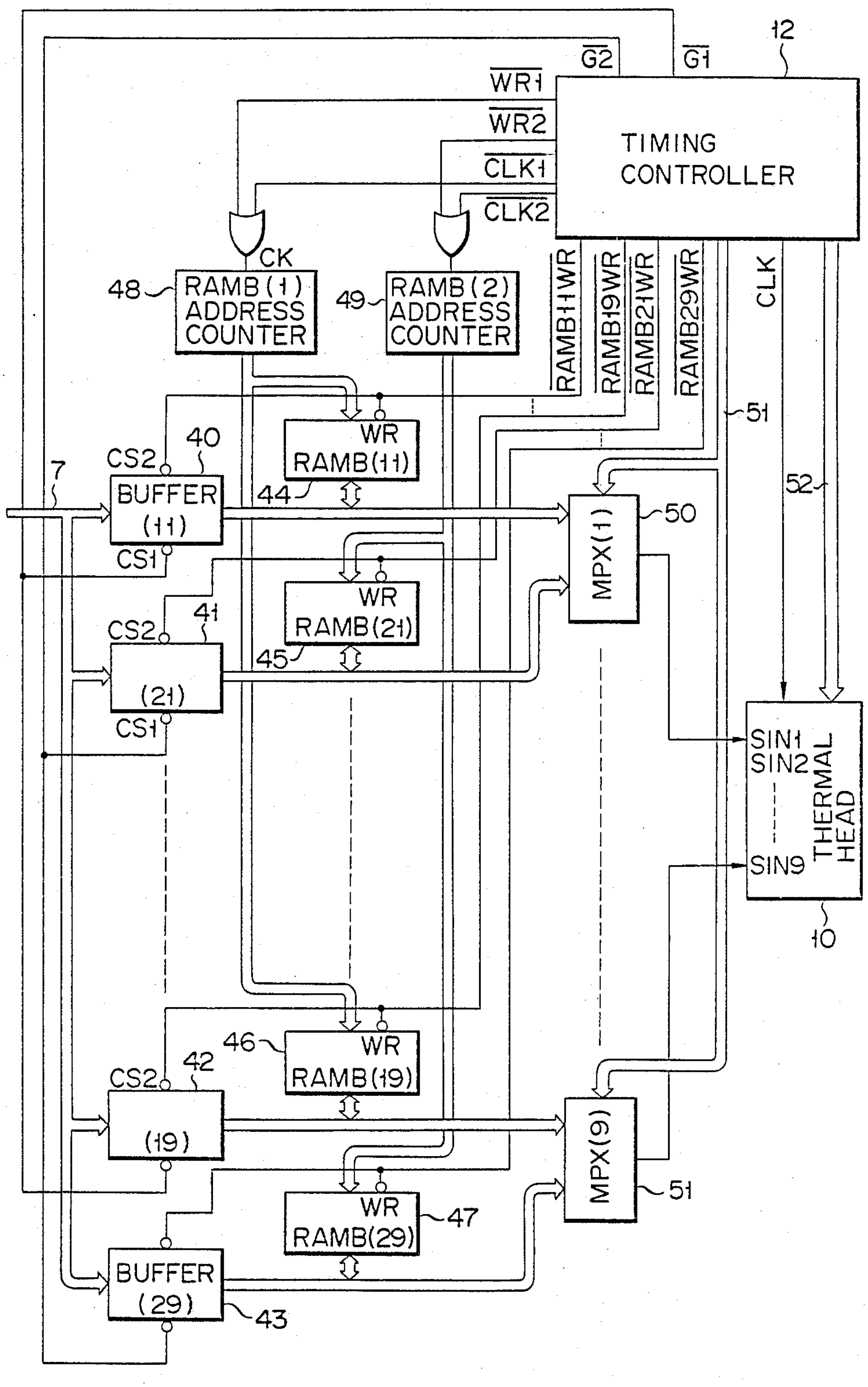
FIG. 5 is a block diagram of a supply energy control section shown in FIG. 1.

FIG. 5 shows the detailed configuration of the supply energy control 9 of FIG. 1. In this embodiment, since the terminal head has a resolution of 12 dots/mm and an A4 width, the number of thermal heating resistive elements is 2592. In order to shorten the time of data transfer to the thermal head, the thermal head of this embodiment has nine input data ports SIN1 to SIN9 each adapted to receive data in a serial manner. Each data port receives data corresponding to 288 resistive elements.

Figure 7:
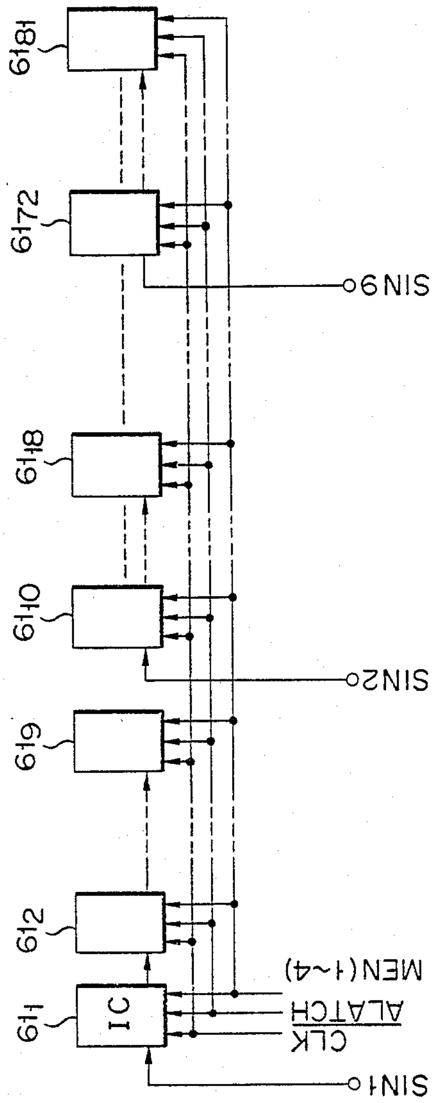
FIG. 7 is a block diagram of drive circuits of the thermal head.
Figure 8:
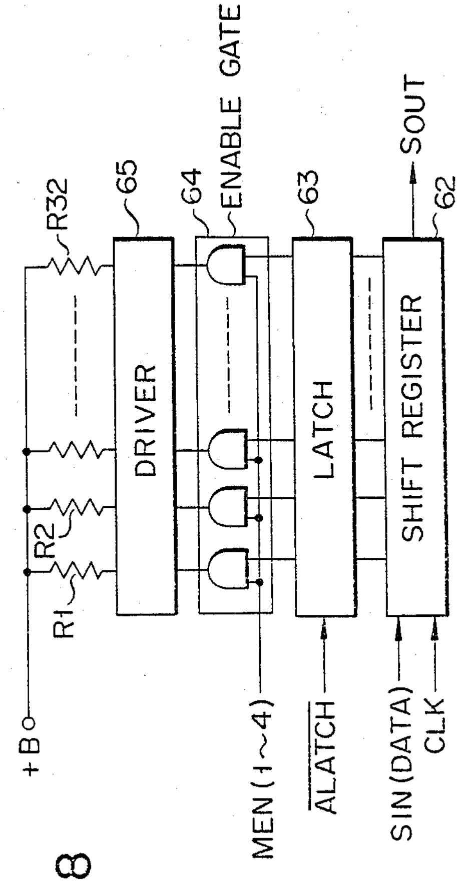
FIG. 8 is a detailed diagram of one of the drive circuits shown in FIG. 7.

The arrangement of the thermal head 10 will be described with reference to FIGS. 7 and 8. In this embodiment, thermal heating resistive element drive ICs are used to drive the elements in units of 32 dots. Each port thus requires 9 drive circuits, so that 81 drive circuits $61_1$ to $61_{81}$ are arranged in the thermal head 10. As shown in FIG. 8, each drive circuit comprises a 32-bit shift register 62, a latch circuit 63, an enable gate circuit 64 and, a driver 65 for driving thermal heating resistive elements R1 to R32.

Referring back to FIG. 5, the supply energy data 7 calculated by the calculator 3 are applied to the a RAMB(11) 44 to a RAMB(19) 46 or a RAMB(21) 45 to a RAMB(29) 47 through a buffer(11) 40 to buffer(19) 42 or a buffer(21) 41 to buffer(29) 43, respectively. Nine buffers (i.e., buffer(1) to buffer(9)) and nine RAMBs (i.e., RAMB(1) to RAMB(9)) respectively correspond to nine ports SIN1 to SIN9. If the thermal head has one input port, one set of a buffer and a RAM suffice. Furthermore, two sets each having nine buffers and nine RAMBs are prepared for a high speed recording. For example, while data are written in the RAMB(11) to RAMB(19), data are read out from the RAMB(21) to RAMB(29). In this manner, the write and read operations can be simultaneously performed. If no high speed operation is required, a set of nine buffers and nine RAMBs may be used.

Assume that a timing signal $\overline{G1}$ is issued from the timing controller 12. The timing signal $\overline{G1}$ and a timing signal $\overline{G2}$ are applied to terminals CS1 of the buffer(11) to buffer(19) and of the buffer(21) to buffer(29), respectively. When the timing signal $\overline{G1}$ is issued, the timing signal $\overline{G2}$ is not issued and vice versa. Each buffer is enabled only when a signal of logic "0" is supplied to the terminals CS1 and CS2 thereof so as to supply the supply energy data from the calculator 3 to the corresponding RAMB. Otherwise, the data line of the supply energy data is disconnected from the corresponding RAMB.

The data is written at an address of RAMBs which is accessed by an address counter 48 or 49 when a signal is applied to its terminal WR. Otherwise, data is read out from an address accessed by the corresponding address counter. The address counter 48 is commonly used for RAMB(11) to RAMB(19), and the address counter 49 is commonly used for the RAMB(21) to RAMB(29). The same address data are supplied to the RAMB(11) to RAMB(19) or RAMB(21) to RAMB(29).

The number of address data is equal to the number of resistive elements for one port, so that the number of address data is 288 in the case of nine ports. Since the timing signal $\overline{G1}$ is issued from the timing controller 12, the RAMB(21) to RAMB(29) are disconnected from the supply energy data lines. When the supply energy of the first resistive element is calculated, a signal RAMB(11) is generaged from the timing controller 12. In this case, the buffer(11) 40 is enabled, so that the supply energy data is coupled to the data line of the RAMB(11).

The supply energy data is written at an address accessed by the address counter 48. Signals RAMB(11)WR to RAMB(19)WR have a period 288 times the period of the signal $\overline{WR}$ shown in FIGS. 4A and 4B. The data is written in the RAMB(11) in response to the signal RAMB(11)WR. The next signal RAMB(12)WR is used to write the data in the RAMB(12). Similarly, the data is written in the RAMB(19) in response to the last signal RAMB(19)WR. Each buffer is enabled only when the signal $\overline{WR}$ is supplied to the corresponding RAMB so as to write the supply energy data in this RAMB.

When the supply energy data of the first resistive element is written in the RAMB(11), the signal $\overline{WR1}$ is issued from the timing controller 12, and the count of the address counter 48 is incremented by one. The signal $\overline{WR1}$ is issued every time one of the RAMB(11) to RAMB(19) receives the signal $\overline{WR}$. The supply energy data of the second resistive element is written in the same manner as in the RAMB(11). The above operation is then repeated to write the first 288 supply energy data in the RAMB(11).

After the supply energy data of the 288th resistive element is written in the RAMB(11), the address counter 48 designates the same address as in the case wherein the supply energy data of the first resistive element is written. The supply energy data of the 289th resistive element is written in the RAMB(12) in response to the signal RAMB(12)WR generated from the timing controller 12. The data line of the RAMB(11) is disconnected from the supply energy data line. In the same manner as in the RAMB(11), after the supply energy data of 289th to 577th resistive elements are written in the RAMB(12), the RAMB(12) is disconnected from the supply energy data line. The above operation is repeated to write the supply energy data of the 2304th to 2592th resistive elements in the RAMB(19). Thus, the calculation for one line is completed.

While the supply energy data for one line are written in the RAMB(11) 44 to RAMB(19) 46, the previous supply energy data are read out from the RAMB(21) 45 to RAMB(29) 47 and are supplied to the thermal head through a multiplexer(1) 50 to a multiplexer(9) 51, thereby energizing the resistive elements to record image data. At this time, the RAMB(21) to the RAMB(29) are disconnected from the supply energy data lines, respectively.

Since the signal $\overline{G1}$ is generated from the timing controller 12, the signals RAMB(21)WR to RAMB(29)WR are not issued. In other words, the RAMB(21) to RAMB(29) are kept in the read mode so that the supply energy data accessed by the address counter 49 is read out onto the data line. In response to control signals 51 from the timing controller 12, one bit of the 4-bit data from each of the RAMB(11) to RAMB(19) or of the RAMB(21) to RAMB(29) is selected by the multiplexer(1) 50 to multiplexer(9) 51 and is supplied to the corresponding port. At the present time, the RAMB(21) to RAMB(29) are set in the read mode, so that the selected one-bit data of data read out from the RAMB(21) to RAMB(29) are issued from the multiplexer(1) to multiplexer(9), respectively. The data supplied to the input ports SIN1 to SIN9 of the thermal head 10 are written in the corresponding shift registers in response to the signal $\overline{CLK}$ generaged from the timing controller 12. At the same time, the timing controller 12 generages the signal $\overline{CLK2}$ to increment the address counter 49 of the RAMB(21) to RAMB(29). As the result, supply energy data corresponding to the next resistive elements in the respective groups are read out from the RAMB(21) to RAMB(29). One-bit data of the same order as the previous one-bit data are supplied to the corresponding terminals SIN through the multiplexer(1) to multiplexer(9). This one-bit data is written in the corresponding shift register in response to the signal $\overline{CLK}$. At this time, the immediately preceding one-bit data is shifted by one bit. This operation is repeated by 288 times, so that the same order bits of all the 4-bit data of the RAMB(21) to RAMB(29) are written in all the eighty-one shift registers 62 in the thermal head 10. The data written in the shift registers 62 is latched by the latch circuits 63 in response to a signal $\overline{ALATCH}$. Output data of the latch circuits 63 is supplied to the drivers 65 through the enable gate circuits 64 which are enabled by one of enable signals MEN-1 to MEN-4 from the timing controller 12. The resistive elements R1 to R2 are heated or are not heated in accordance with the corresponding data "0" or "1". The enable signals MEN-1 to MEN-4 supplied to the gate circuits 64 have different pulsewidths to be described later.

Figure 6A:
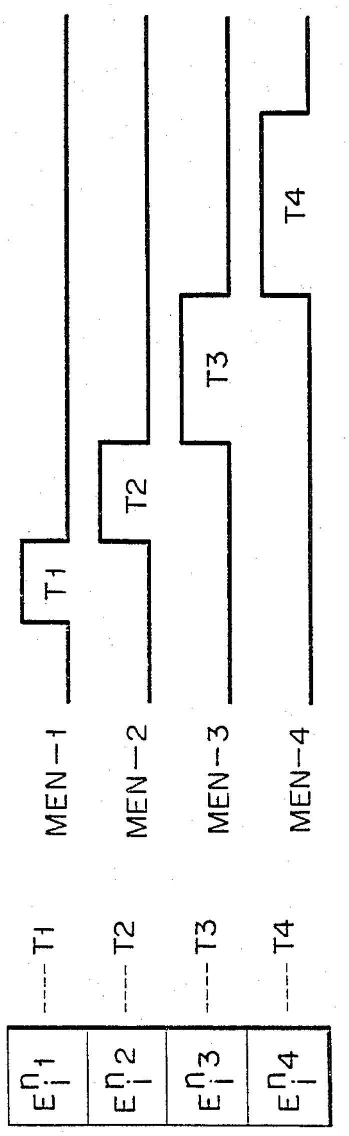
FIGS. 6A and 6B are diagrams for explaining the control of the supply energy.

FIG. 6A shows the relationship between the 4-bit supply energy data 7 and the enable signals MEN-1 to MEN-4. In this embodiment, a voltage applied to the resistive elements of the thermal head is constant, so that a current flowing therethrough is also constant. In order to change the supply energy of the resistive elements, the energizing time must change in accordance with the supply energy. The 4-bit supply energy data generated from the calculator represents an energizing time of a resistive element. However, the energizing time cannot vary in units of resistive elements because of the structural restriction of the thermal head. In practice, the energizing times of the resistive elements have the same length of period. In order to vary the energizing times of the resistive elements, the energization of each resistive element may be repeated several times in accordance with the corresponding supply energy data.

Figure 6B:

In this embodiment, as shown in FIG. 6, four energizing times T1 to T4 are set in accordance with the four enable signals MEN-1 to MEN-4. The four energizing times and the four bits of the supply energy data have a one-to-one correspondence. For example, the MSB $E_{in}1$ corresponds to energizing time T1; $E_{in}2$, to T2; $E_{in}3$, to T3; and $E_{in}4$, to T4. The energizing time of each resistive element is selected by a bit or bits of "1" of the supply energy data. For example, if $E_{in}1=E_{in}3=E_{in}4=1$ and $E_{in}2=0$, the energizing times T1, T3 and T4 are selected as shown in FIG. 6B. The corresponding resistive element is energized during a time of T1+T3+T4. In this embodiment, the energizing time of each resistive element is changed in such a manner as described above.

Furthermore, according to this embodiment, the times T1, T2, T3 and T4 can be freely set in accordance with the enable signals MEN-1 to MEN-4. When T1=T2=T3=T4, a maximum four steps of the energizing time intervals can be obtained. When the pulsewidths of the enables signals MEN-1 to MEN-4 (corresponding to the times T1 to T4) differ from each other, a maximum of 16 steps of the energizing time intervals can be obtained. Furthermore, if the number of bits of the supply energy data is increased, or the supply order of enable pulses having different pulsewidths is changed, then the more precise control of the energizing time would be enabled.

The operation of the thermal recording system will be repeated.

The multiplexer(1) to multiplexer(9) select, for example, the MSB $E_{in}1$ of the 4-bit supply energy data read out from the RAMB(21) to RAMB(29) to feed the thermal head 10. As previously described, when the readout of one-bit data is performed 288 times, all the MSB data $E_{in}1$ of the supply energy for all the resistive elements are written in the shift registers of the thermal head 10. The MSB data are latched by the latch circuits in response to the signal $\overline{ALATCH}$ generated from the timing controller 12. Next, the latched data are supplied to the drivers through the gate circuits in response to the enable signal MEN-1 for setting the energizing time T1. As a result, a current is supplied to the resistive elements corresponding to data of "1" for the energizing time T1.

When the MSB data $E_{in}1$ are latched by the latch circuits, data readout from the RAMB(21) to RAMB(29) is restarted from address 1. At this time, the multiplexer(1) to muliplexer(9) select the bit $E_{in}2$ (next to the MSB) of the 4-bit supply energy data read out from each of the RAMB(21) to RAMB(29). In the same manner as in the MSB data, the resistive elements are selectively energized in accordance with the data $E_{in}2$ of the 4-bit supply energy data for the time T2 set by the enable signal MEN-2.

Data readout from the RAMB(21) to RAMB(29) is restarted from address 1 thereof. In this case, the multiplexer(1) to multiplexer(9) select the one-bit data $E_{in}3$. The timing controller 12 generates the enable signal MEN-3, so that the resistive elements are selectively energized for the time T3 set by the enable signal MEN-3. Finally, the fourth time data readout operation is performed with respect to the RAMB(21) to RAMB(29). The multiplexer(1) to multiplexer(9) select the LSB data $E_{in}4$ of the 4-bit supply energy data. The timing controller 12 supplies the enable signal MEN-4 to the enable gate circuit 64. As a result, the resistive elements are selectively energized for the time T4 set by the enable signal MEN-4. In this manner, the four-time data readout operations from the RAMBs and the four-time selective energizations of the resistive elements in accordance with the readout data are performed to print the image data corresponding to one line.

The supply energy must be preset to cause the resistive element to reach a predetermined temperature, since the transfer factor of ink to a sheet depends solely on the temperature of the resistive element, as has been found according to the experiments.

The features of the present invention described above will be summarized as follows:

(1) The storage energies are determined in accordance with input image data to be recorded and the storage energies resulting from the recording operation of the previous image data;

(2) The supply energy is determined in accordance with this storage energy and the input image data; and (3) Time and space factors are considered with respect to the thermal conduction.

The present invention is not limited to the particular embodiment. Various changes and modifications may be made within the spirit and scope of the present invention. For example, the content of the ROM of the calculator 3 may be obtained theoretically or empirically. Alternatively, the calculator 3 may be comprised of a CPU or the like.

What is claimed is:

1. A thermal recording system comprising:

a thermal head having a number of thermal heating resistive elements and drive circuit means for selectively energizing said thermal heating resistive elements, with current supply, in accordance with image data to record the image data;

memory means for storing data of a storage energy of each of said thermal heating resistive elements after the image data have been recorded;

calculating means responsive to storage energy data from said memory means and next image data for calculating supply energy to be supplied to each of said resistive elements to record the next image data and a storage energy stored in each of said thermal heating resistive elements after the next image data have been recorded; and controlling means responsive to the supply energy data of each of said resistive elements from said calculating means for causing said drive circuit means to control the supply energy to be applied to each of said thermal heating resistive elements.

2. A system according to claim 1, wherein the storage energy data calculated by said calculating means is stored in said memory means, whereby the storage energy data stored in said memory means is updated every time new image data is recorded.

3. A system according to claim 1, wherein said calculating means is arranged to calculate the supply energy to an ith thermal heating resistive element in accordance with image data for said ith resistive element and adjacent resistive elements arranged on the right and left sides of said ith thermal heating resistive element, and the storage energy data of said ith and adjacent resistive elements which are stored in said memory means.

4. A system according to claim 3, wherein said calculating means is connected to receive the storage energy data of said ith thermal heating resistive element and an average value of the storage energy data of at least a pair of corresponding resistive elements arranged on the right and left sides of said ith resistive element.

5. A system according to claim 3, wherein said calculating means comprises a read only memory arranged to receive, as address data, the image data and the storage energy data of said thermal heating resistive elements, and store the supply energy data and the storage energy data for one thermal heating resistive element at an address specified by the address data.

6. A system according to claim 1, wherein each of the supply energy data has a plurality of bits, and said control means is arranged to supply the supply energy data of each of said thermal heating resistive elements to said drive circuit means in units of corresponding bits, so that the image data for each of said resistive elements is recorded in a time division manner, the number of time divisions corresponding to the number of bits.

7. A system according to claim 6, wherein said drive circuit means comprises: shift register means connected to receive the supply energy data of said thermal heating resistive elements in units of corresponding bits; latch circuit means for latching a plurality of bit outputs of said shift register means; and enable gate circuit means coupled between said bit outputs of said latch circuit means and said thermal heating resistive elements, said enable gate circuit means being enabled each time corresponding bits of the supply energy data of said resistive elements are recorded.

8. A system according to claim 7, wherein enabling times of said enable gate circuit means vary with bits of the supply energy data.

9. A system according to claim 1, wherein the supply energy data has a plurality of bits; and said control means comprises temporary memory means for temporarily storing the supply energy data of said thermal heating resistive elements which are generated from said calculating means, multiplexer means for sequentially supplying to said drive circuit means corresponding bits of the supply energy data which are sequentially read out from said temporary memory means, and means for causing said temporary memory means to read out the supply energy data for the number of times corresponding to the number of the bits of the supply energy data and for causing said multiplexer means to supply the supply energy data to said drive circuit means in units of corresponding bits, thereby recording the image data in a time division manner for each bit of the supply energy data.

10. A system according to claim 1, wherein said thermal heating resistive elements of said thermal head are divided into a plurality of groups, said drive circuit means is divided into sub-drive circuit means corresponding to said plurality of groups, and said control means comprises a plurality of memory means for temporarily storing the supply energy data supplied from said calculating means in units of groups, and means for reading out the supply energy data from said plurality of memory means to supply readout data to corresponding sub-drive circuit means of said drive circuit means in a parallel manner.

11. A method of recording image data using a thermal head having a number of thermal heating resistive elements aligned in line and drive circuit means for selectively energizing said thermal heating resistive elements, with current supply, in accordance with the image data to record the image data of one line, comprising of the steps of:

providing, as data having a plurality of bits, supply energy to be supplied to each of said thermal heating resistive elements to record the image data of one line in accordance with the image data of one line to be recorded and storage energy stored in each thermal heating resistive element after image data of an immediately preceding line has been recorded;

supplying to drive circuit means the supply energy data for said thermal heating resistive elements in units of corresponding bits; and energizing said thermal heating resistive elements every time corresponding bits of the supply energy data is supplied to said drive circuit means.

12. A method according to claim 11, wherein energizing times of said thermal heating resistive elements vary with bits of the supply energy data.

* * * * *